United States Patent [19]

McCartney

[11] 4,082,155
[45] Apr. 4, 1978

[54] WHEELED UNDERCARRIAGE FOR SNOWMOBILES

[75] Inventor: Clyde B. McCartney, Big Stone City, S. Dak.

[73] Assignees: Wayne Parrow; Harold Parrow, both of Delworth, Minn. ; part interest to each

[21] Appl. No.: 765,408

[22] Filed: Feb. 3, 1977

[51] Int. Cl.² ............................................. B62M 27/00
[52] U.S. Cl. ............................... 180/5 R; 180/9.24 R; 280/7.12; 280/8
[58] Field of Search .................. 180/5 R, 9.24 R, 9.3, 180/5 A; 280/7.12, 8, 670

[56] References Cited

U.S. PATENT DOCUMENTS

| | | | |
|---|---|---|---|
| 3,650,342 | 3/1972 | Pushnig et al. | 180/5 R |
| 3,651,879 | 3/1972 | Wilson | 180/5 R |
| 3,664,447 | 5/1972 | Kane | 180/5 R |
| 3,696,877 | 10/1972 | Dessvreault | 180/5 R |
| 3,774,706 | 11/1973 | Kiekhaefer | 180/5 R |

Primary Examiner—Richard A. Bertsch
Attorney, Agent, or Firm—Burd, Braddock & Bartz

[57] ABSTRACT

A four wheeled undercarriage is mounted to a snowmobile body having a tunnel from which the endless track drive assembly has been removed. The ski-mounting brackets of the snowmobile support the front end of the snowmobile body on a front axle bolster and two steerable wheels. Steering is accomplished through one of these brackets. The rear end of the snowmobile body is supported by two suspension spring assemblies on a triangular rear wheel support frame and two rear wheels. A transversely extending undercarriage positioning bar installed in a forward portion of the snowmobile tunnel positions the forward end of the triangular support frame and adjustably positions the attitude of the front axle bolster to control the camber of the steerable wheels. A stabilizer bar between the rear support frame and the snowmobile body allows vertical movement but restricts lateral movement of the snowmobile body with respect to the rear wheels.

9 Claims, 9 Drawing Figures

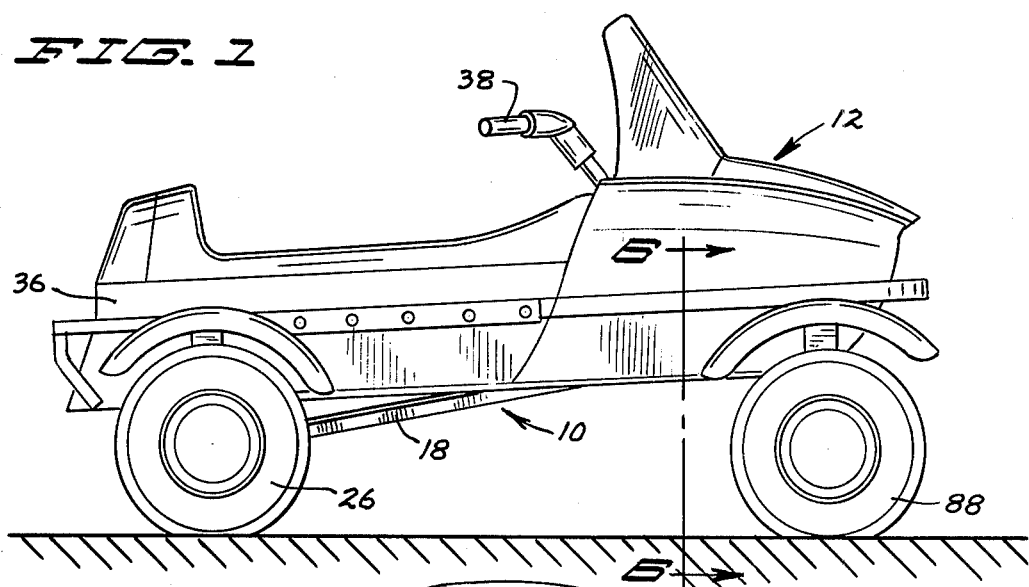
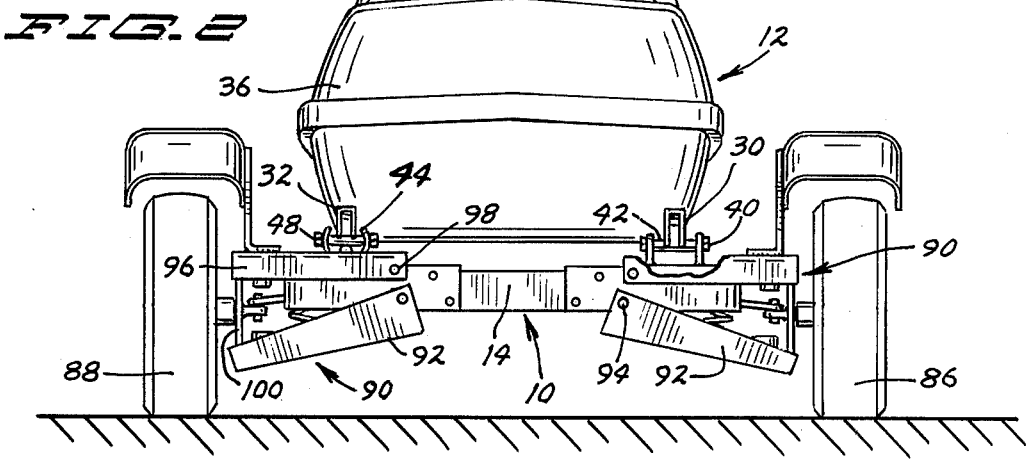
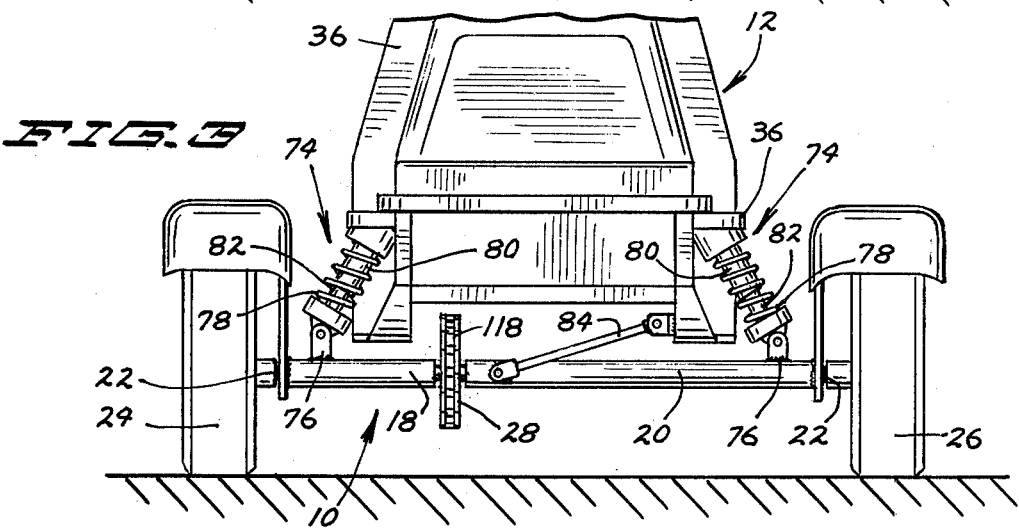

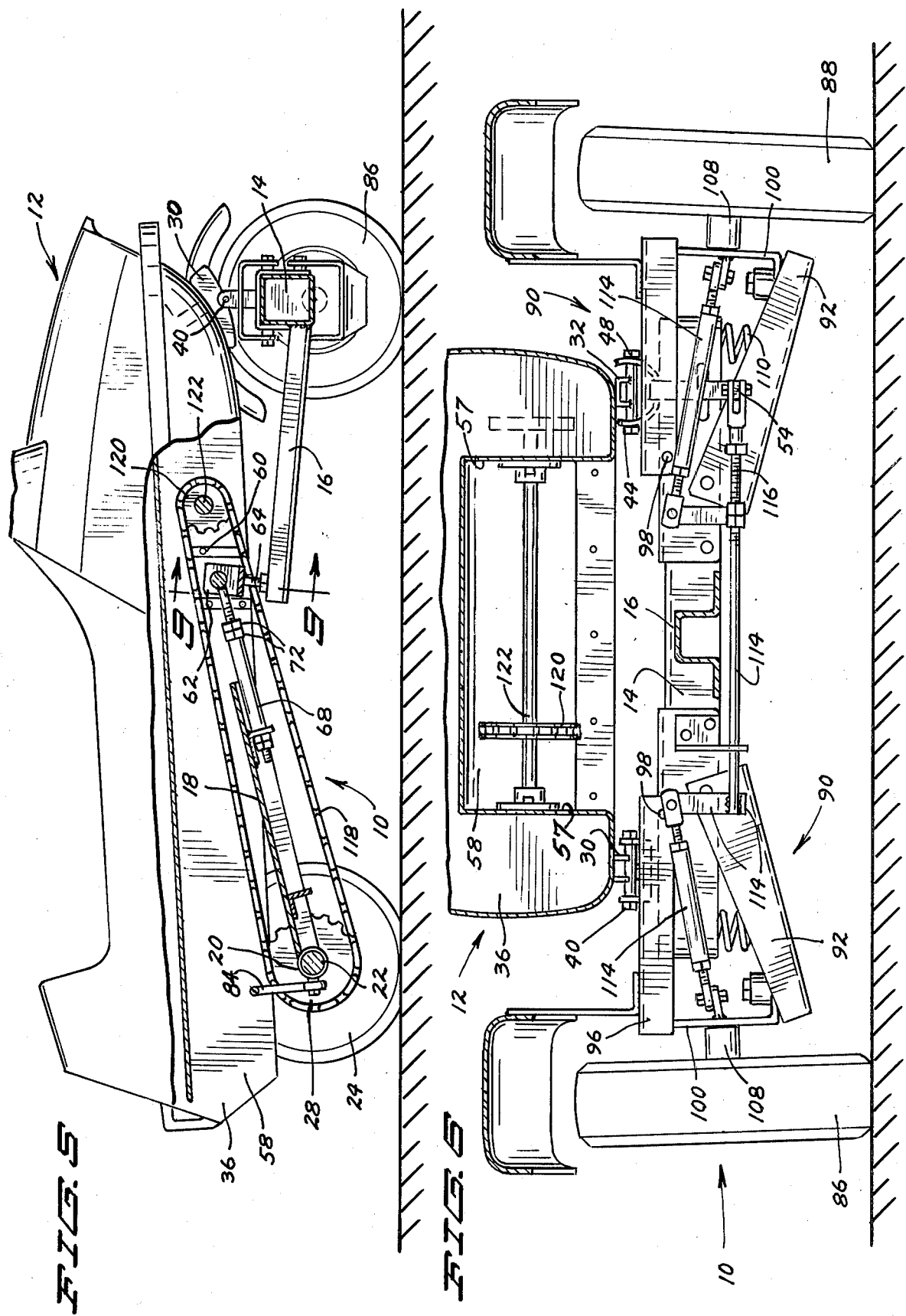

WHEELED UNDERCARRIAGE FOR SNOWMOBILES

BACKGROUND OF INVENTION

This invention has relation to wheeled undercarriages which can be easily and conveniently mounted to snowmobiles after the endless track drive assembly of the snowmobile has been removed thus to allow the snowmobile body and its engine and steering mechanism to be utilized in an over-the-road or all-terrain wheeled vehicle. The invention presents a wheeled undercarriage conversion kit which is adaptable to reversibly convert any one of a large number of different sizes and models and makes of snowmobiles to over-the-road operation.

It is not new broadly to convert a snowmobile having a body and an endless track drive mechanism mounted in a downwardly opening tunnel inside of the body for use on wheels. See U.S. Pat. No. 3,480,096 granted in November of 1969 to Hammitt. In this patent, however, the snowmobile track means and the other elements of the endless drive track assembly are left undisturbed, and a rear wheel drive axle is extended outwardly from the rear sprocket axle of the snowmobile. At the front end, the entire ski and vertical spindle mounting the ski are removed and a separate spindle, mounting a front steering wheel, is replaced in a special construction which is useful, of course, only on a machine built for the specific conversion shown in Hammitt. This structure would be of no value whatever in converting any one of a very large number of ordinary snowmobiles, built only for snowmobile action, into over-the-road vehicles.

Apparatus for converting from over-the-road to over-the-snow operation and back again is also shown in U.S. Pat. No. 3,370,665, granted in February of 1968 to Stanaback. In this structure, however, a tandem axle over-the-road vehicle is converted for operation over the snow by the expedient of attaching endless snow traction drive belts over each set of tandem wheels.

Other patents which disclose conversions of snowmobiles for over-the-road operation include U.S. Pat. Nos. 3,521,719, granted July 28, 1970 to Coons; 3,664,447, granted in May of 1972 to Kane; and 3,774,706, granted in November of 1973 to Kiekhaefer. Each of these structures, however, contemplates a substantial complete rebuilding and modification of the underside and interior works of the snowmobile to accommodate the frame and wheel structures. It is evident that the structure of each of these patents must be adapted to a particular model, size and make of snowmobile in order to be effective. None presents a kit which can be substantially universally utilized to convert most if not all of the snowmobiles on the market today to effective over-the-road action and back again utilizing only the two ski mounting brackets on the front of the snowmobile, one transversely extending positioning shaft across a forward portion of the snowmobile tunnel, and two suspension spring assemblies from the rear of the snowmobile body to a frame supporting the two rear over-the-road wheels.

U.S. Pat. Nos. 712,196, 1 granted in October of 1902 to Lane et al and 2,692,778 granted in October of 1954 to Stump show the use of triangular frames to support vehicle wheels for a rocking axle suspension. Each of these patents discloses, however, simply an over-the-road motor vehicle. No concept of how to utilize a triangular frame to obtain a rocking action with respect to rear wheels on a replaceable wheeled undercarriage under a snowmobile while still resiliently supporting the rear portion of the snowmobile is shown or suggested.

U.S. Pat. No. 2,675,247 granted in April of 1954 to Meng shows four independent wheel suspensions on a vehicle chassis of a regular motor vehicle. It does not show or suggest any way of adapting such a structure to use on a wheeled undercarriage for converting snowmobiles either.

A suspension and drive mechanism for endless tread vehicles in which the right tread is independent in suspension from the left tread is shown in U.S. Pat. No. 2,967,578 granted in January of 1961 to Schomers. However, the front and rear wheels on either side of the structure are not independent from each other, so four wheel flexibility over uneven terrain is not obtainable by using the structure shown in this patent or any structure suggested by it.

U.S. Pat. No. 3,623,563 granted in November of 1971 to Gostomski shows a particular structure resiliently mounting the skiis to the front end of a snowmobile and provides a plate for attaching the ski to the bottom of the suspension mechanism. A front steering wheel is provided with a matching attachment so that it can be substituted for the ski. Obviously the teaching of this patent is only useful in connection with one particular kind of ski mounting and a matching, identical kind of front wheel mounting. It is in no way adaptable to use with a conversion kit which will allow a wheeled undercarriage to be used to adapt many kinds of snowmobiles for over the road operation.

U.S. Pat. Nos. 3,847,239, granted in November of 1974 to Copeland, 3,825,086, granted in July of 1974 to Bombardier and 3,882,948, granted in May of 1975 to Southiere disclose snowmobile steering mechanisms which have a steering geometry to reduce skidding when the snowmobile takes a corner. This structure, however, is only the starting point for the structure disclosed in the present application. For example, in the patent to Southiere, the spring couplers 58,68 which connect to the leaf springs 55, 65 of the skiis are equivalent to ski-mounting brackets 30,32 of the present invention; and horizontal pins 59,69 of Southiere are equivalent to deadbolt 40 and ski rocker pin 48 in the present specification. To disable the steering mechanism of the Southiere patent, in the manner subsequently called for in this specification, tie rod 122 of Southiere could be removed, for example.

Other patents which were located during a preliminary search of the present invention are:

U.S. Pat. No. 3,414,290 granted in December of 1968 to Wilfert et al; and

U.S. Pat. No. 1,192,081 granted in July of 1916 to Loxley et al.

These patents are believed to be at least somewhat pertinent.

Applicant is aware of no further pertinent prior art.

SUMMARY OF THE INVENTION

The endless drive track mechanism of a conventional snowmobile is removed from the tunnel of the snowmobile body, and a transversely extending undercarriage positioning bar is mounted on opposite interior facing vertical side walls of that tunnel to extend transversely across it. The linkage between the steering handle bars and one of the skiis is disconnected or otherwise disabled, and both skiis are removed. A front axle bolster of the undercarriage of the invention is deadbolted to the disabled ski-mounting bracket on one side of the snowmobile body, and is mounted to be tightly held against the steerable ski-mounting bracket on the other side. This steerable ski-mounting bracket is mounted to a steering yoke rotatably mounted with respect to the front axle bolster and to a substantially vertical steering column which extends integrally from that yoke downwardly through the front axle bolster. A steering crank arm is integral with the steering column and extends outwardly through the front axle bolster to connect to a tie rod assembly which controls the steering of a pair of steerable front wheels which are rotatably mounted with respect to the front axle bolster.

A rearwardly extending camber control arm is integral with and extends substantially horizontally rearwardly from a center point of the front axle bolster. The front wheels are mounted with respect to the front axle bolster to have a certain amount of camber when the camber control arm is situated in parallel relationship with respect to the surface on which the undercarriage is supported, and the rear end of the camber control arm is vertically adjustably mounted with respect to the undercarriage support bars so that the effective camber of the front wheels can be adjusted to a desired optimum condition by adjusting the distance between the rear end of the camber control arm and the undercarriage positioning bar.

A triangular rear wheel support frame extends from an apex rotatably supported with respect to the undercarriage positioning bar. A pair of rear drive wheels are integrally supported on a drive axle extending along the base leg of this rear wheel support frame, that base leg being formed by a rear axle casing in surrounding relation to the rear drive axle.

A pair of suspension spring assemblies are each mounted to the snowmobile body one above each end of the rear axle casing. As shown, each such assembly includes a coil suspension spring pinned on one end to the rear axle casing and on the other end to the snowmobile body. A pair of mutually telescoping pipes are encompassed by each coil spring, one of the pipes being attached to move with the snowmobile body and the other to move with the axle bolster.

A stabilizing bar is pivotally mounted to the rear axle casing along the base leg of the rear wheel support frame and is pivotally mounted to one side of the snowmobile body to allow movement of the rear wheels and support frame vertically with respect to the snowmobile body but to restrict lateral movement of the body with respect to the support frame and on the wheels.

The drive sprockets of the endless drive track of the unconverted snowmobile are replaced with a roller chain drive sprocket on the snowmobile drive shaft, and a roller drive chain extends from around that sprocket, both above and below the rear wheel support frame, and over a driven sprocket which is mounted in provided openings in the rear axle casing and support frame to be integral with the rear axle.

IN THE DRAWINGS

FIG. 1 is a side elevational view of a snowmobile supported and assembled on the wheeled undercarriage of the invention;

FIG. 2 is an enlarged front elevational view of the snowmobile and undercarriage of FIG. 1 with parts omitted for clarity of illustration.

FIG. 3 is a fragmentary rear elevational view of the structures of FIGS. 1 and 2 with parts omitted;

FIG. 5 is an enlarged side elevational view of the structure of FIG. 1 with parts in section and parts broken away;

FIG. 6 is an enlarged fragmentary vertical sectional view taken on the line 6—6 in FIG. 1;

DESCRIPTION OF PREFERRED EMBODIMENT

Figure 4:
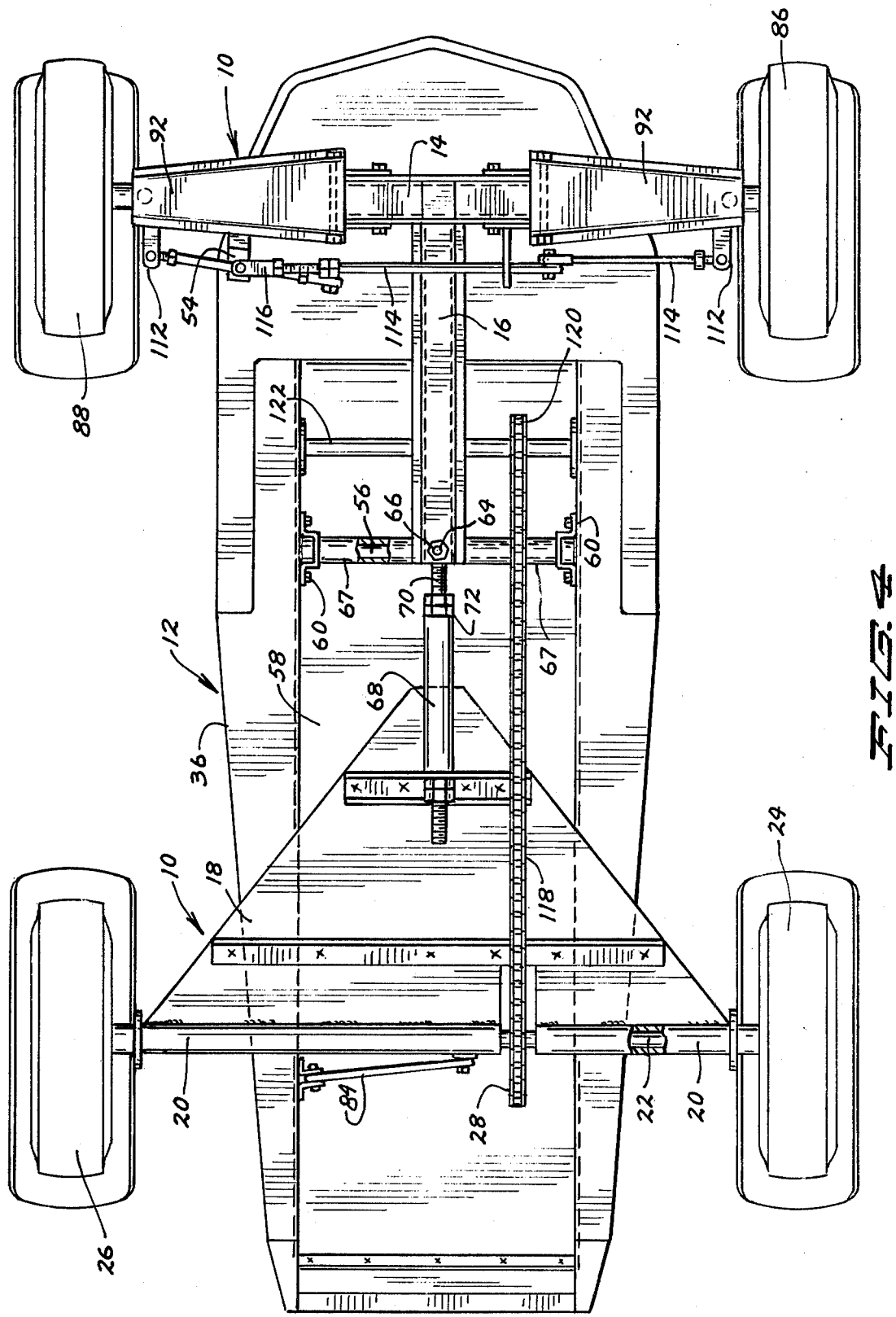
FIG. 4 is an enlarged bottom view of the structure of FIGS. 1 through 3.

A wheeled undercarriage 10 supports a snowmobile 12 from which the endless track drive assembly and forward support and steering skiis have been removed. The undercarriage includes a front axle bolster 14 and a camber control arm 16 integral with the front axle bolster and extending rearwardly from a center point of it. A triangular rear wheel support frame 18 of the undercarriage is adjustably connected to a rearward end of the camber control arm and includes a rear axle casing 20 forming a part of the base leg of the support frame 18. A rear axle 22 is rotatably supported in rear axle casing 20 and integrally supports rear wheels 24 and 26. A driven sprocket 28 is mounted in the rear wheel support frame 18 and rear axle casing 20 to rotate with rear axle 22.

Figure 7:
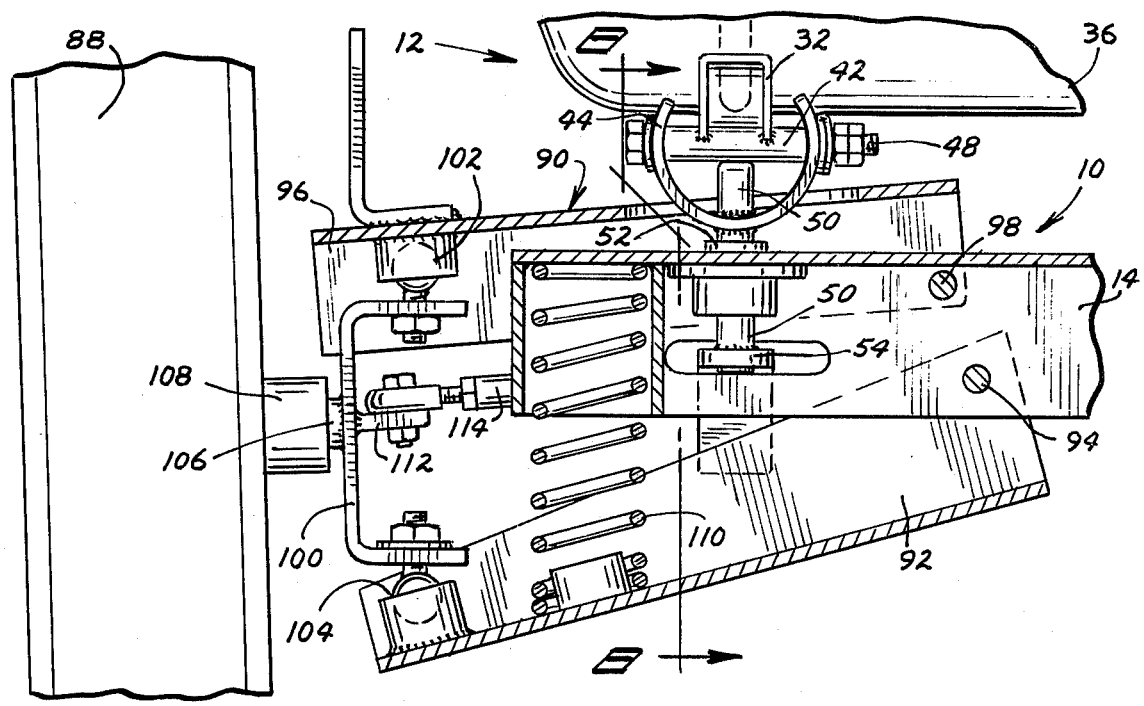
FIG. 7 is a fragmentary vertical sectional view with parts in section and parts broken away and showing the front wheel suspension mechanism and portions of the steering mechanism of the front wheel as seen to the left in FIG. 2.
Figure 8:
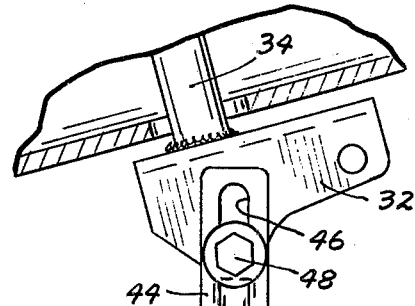
FIG. 8 is a vertical sectional view taken on the line 8—8 in FIG. 7.
Figure 9:
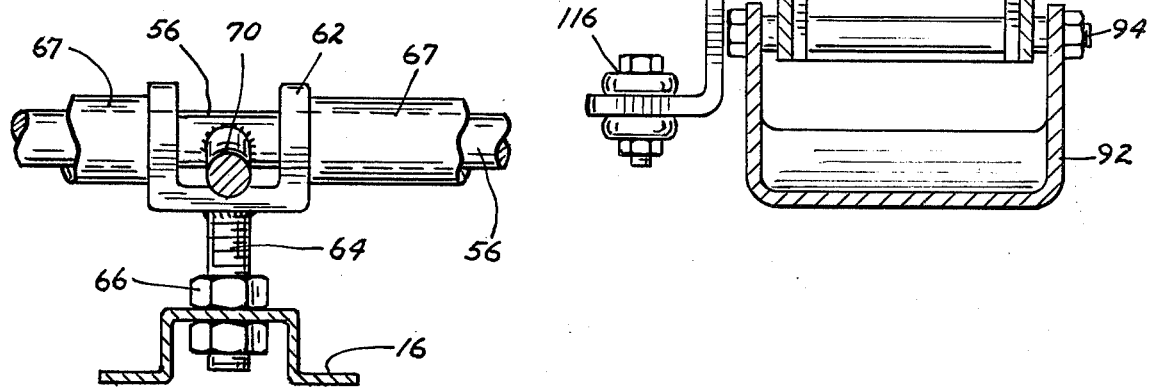
FIG. 9 is an enlarged vertical sectional view taken on the line 9—9 in FIG. 5.

In normal over-the-snow operation, the snowmobile 12 is provided with a ski-mounting bracket 30 for mounting a ski on the left side of a snowmobile facing forward and as seen to the right in FIG. 2 and to the left in FIG. 6. A ski-mounting bracket 32 is provided to mount a ski on the right side of the snowmobile as seen to the left in FIG. 2, to the right in FIG. 6 and as seen in FIGS. 5, 7 and 8. As best seen in FIG. 8, ski-steering shafts 34 steerably support one or the other of the ski-mounting brackets 30 and 32. These ski-steering shafts 34 are mounted up inside of a body 36 of the snowmobile 12 and are steered by handlebars 38 through any usual or desired linkage (not shown) such, for example, as a conventional tie rod steering geometry system or structure. This structure forms no part of the present invention. The steering of the wheeled undercarriage of the invention is accomplished through the ski-mounting bracket 32, so the internal steering linkages to ski-mounting bracket 30 are disconnected inside of the snowmobile thus making the ski-mounting bracket available to be deadbolted to the front axle bolster 14 as at 40 as perhaps best seen in FIGS. 2 and 5.

As best seen in FIG. 7, a ski rocker sleeve 42 is integral with each of the mounting brackets 30 and 32 and normally extends transversely of the direction of movement of the snowmobile. An undercarriage steering yoke 44 is provided with a pair of ski rocker pin receiving slots 46,46 which receive a ski rocker pin 48 which extends through ski rocker sleeve 42. In the form of the invention as shown, the rocker pin 48 is constituted as a bolt fixed in place with two nuts turned tightly against each other to provide clearance between washers on either end of the bolt and outboard of the steering yoke.

This allows the rocker pin 48 to move in the steering yoke rocker pin receiving slots 46,46, thus to impart steering motion from the ski-mounting bracket 32 to the steering yoke 44 in a manner to be described.

A ski rocker sleeve support and undercarriage steering column 50 is journaled in the front axle bolster 14 as at 52, and has an integral steering crank arm 54 extending rearwardly outwardly therefrom at a bottom end thereof through a provided opening in the front axle bolster 14. This column 50 supports the rocker sleeve 42 on the axis of the ski steering shaft 34. The steering yoke 44 is integral with the support and steering column 50.

In converting from over-the-snow operation to wheeled operation, after the endless drive track assembly of the snowmobile has been removed, a transversely extending undercarriage positioning bar 56 is rotatably mounted with respect to the body 36 of the snowmobile 12 in mounting brackets 60, 60 in which are fastened to vertical wall 57, 57 of a nominal drive track assembly receiving tunnel 58. The rearward end of camber control arm 16 is supported with respect to the undercarriage positioning bar 56 by a U-shaped hanger 62, pivotally mounted with respect to the positioning bar 56, and by a threaded hanger bolt 64 integral with the hanger and adjustably mounted with respect to the camber control arm 16 by locking nuts 66, 66. Sleeves 67, 67 on the positioning bar 56 serve as spacers for the hanger 62.

The front wheels 86 and 88 are mounted to front axle bolster 14 to have a certain amount of camber when camber control arm 16 is situated in parallel relation to the surface on which the undercarriage is supported. See FIG. 6. By adjusting the position of the rearward end of the camber control arm on hanger bolt 64, the effective camber of those wheels can be adjusted to achieve the optimum desired value. This is important in an undercarriage structure of the present invention which should be usable with many sizes of snowmobiles where the distance between the transversely extending undercarriage positioning bar and the supporting surface for wheels varies widely.

The triangular rear wheel support frame 18 is mounted at its apex with respect to the transversely extending undercarriage positioning bar 56 through the instrumentality of a sleeve 68 integral with the support frame 18 and extending forwardly of it, and a rear wheel support frame attachment rod 70 extending through sleeve 68 and fixed in longitudinal relationship to the support frame by lock nuts 72,72. The support frame attachment rod 70 is integral with the undercarriage positioning bar 56.

The rearward end of the triangular rear support frame 18 is attached to the snowmobile body 36 through the instrumentality of a pair of suspension spring assemblies 74,74. See FIG. 3. Spring assembly support lugs 76 extend upwardly from opposite outer end portions of the rear axle casing 20, and each spring assembly 74 includes a compression coil spring 78 pinned at an upper end to the snowmobile body 36 and at a lower end with respect to support lug 76, and a pair of telescoping pipes 80 and 82, one end affixed to the snowmobile body 36 and the other affixed with respect to support lug 76. The inner diameter defined by each compression coil spring 78 and the outer diameter of the outer telescoping pipe 80 and 82 are such that any tendency for the compression coil spring 78 to buckle out of its nominal aligned relationship is defeated by the presence of the pipes.

A stabilizing bar 84 is pivotally mounted along the base leg or rear axle casing 20 and is also pivotally mounted with respect to the snowmobile body 36 as best seen in FIGS. 3 and 4. This stabilizing bar allows vertical movement of the rear of the rear wheel support frame 18 with respect to the rear of the snowmobile body 36 while restricting transverse movement of the rear of the snowmobile body with respect to the rear wheel support frame and the rear wheels 24 and 26.

Steerable undercarriage front wheels 86 and 88 are each supported with respect to the front axle bolster 14 by one of a pair of substantially identical front wheel suspension assemblies 90,90. Each of these assemblies includes a lower wheel suspension member 92 pivotally mounted to the front axle bolster 14 as at 94, and an upper wheel suspension member 96 pivotally mounted to the axle bolster as at 98. A U-shaped bearing support bracket 100 is supported with respect to outer end portions of the lower wheel suspension member 92 and the upper wheel suspension member 96 through the instrumentality of upper and lower ball and socket joints 102 and 104. A bearing spindle 106 extends outwardly from each bracket 100 to support one of the front wheels 86 and 88 in a bearing 108.

Resilient action between the front axle bolster 14 and the front wheel suspension assemblies 90 is provided by front end suspension coil springs 110. See FIG. 7.

Each wheel bearing support bracket 100 is provided with an integral support bracket steering arm 112 which extends rearwardly from the bracket. Connection to the bracket 100 is best seen in FIG. 7 and the rearward projection is best seen in FIG. 4. Outer rearward ends of these steering arms 112 are linked to each other by a rigid tie rod assembly 114, as best seen in FIGS. 4 and 6. This linkage of wheel support bracket steering arms 112,112 and tie rod assembly 114 provides for a conventional steering geometry action when the tie rod assembly is moved transversely of the wheeled undercarriage to steer it.

Transverse movement of the tie rod assembly 114 is accomplished by manipulation of handle bars 38 to cause rotation of ski mounting bracket 32 thus to rotate steering yoke 44, steering column 50 and steering crank arm 54. The outer end of steering crank arm 54 is pivotally attached to a steering rod 116 which is an integral extension of a central portion of the rigid tie rod assembly 114. Movement of steering rod 116 and hence tie rod assembly 114 transversely with respect to the undercarriage 10, causes the front wheels 86 and 88 to turn to steer the snowmobile and the undercarriage.

Because ski rocker sleeve support and undercarriage steering column 50 supports the rocker sleeve 42 on its own axis of rotation and on the axis of rotation of the steering shaft 34, and because these axes are not in alignment with each other, the rocker pin 48 moves around the yoke 44 in the rocker pin receiving slots 46,46. There is no lost motion, and the steering is accurately accomplished.

The endless drive track assembly of a snowmobile typically includes a track drive shaft on which are fixed one or more endless track drive sprockets designed to mesh with portions of the drive track to move it to drive the snowmobile. When the drive track assembly is removed to convert to over-the-road or over-the-field operation, a snowmobile drive shaft 122 extending across the tunnel 58 will remain but the track drive sprockets will be surplanted by a drive sprocket 120 integrally mounted on the drive shaft. A roller drive chain 118 connects sprocket 120 to driven sprocket 28 to transmit power from the snowmobile engine (not shown) to rear wheels 24 and 26.

The embodiments of the invention in which an exclusive property or privilege is claimed are defined as follows:

1. A wheeled undercarriage for use with a snowmobile having a body provided with an endless drive track assembly tunnel, a drive shaft in said tunnel, a steerable ski-mounting bracket and another ski-mounting bracket each extending from spaced apart forward portions of the body, said undercarriage including:
    A. an undercarriage positioning bar mounted to the snowmobile body inside of the tunnel;
    B. a rear wheel support frame rotatably mounted at a forward portion thereof to said positioning bar in approximate alignment with the longitudinal center of the snowmobile body, said support frame having a rear axle casing at a rear portion thereof;
    C. a rear axle in said casing;
    D. a pair of rear wheels each supported on an opposite end of said rear axle for rotation therewith;
    E. a pair of resilient suspension assemblies each supporting one side of a rear portion of said snowmobile body on a portion of said rear support frame adjacent said rear axle casing;
    F. a means for restricting transverse movement of said snowmobile body with respect to said rear wheels and rear axle casings;
    G. a front axle bolster mounted with respect to the snowmobile body at the ski-mounting brackets and connected to said positioning bar;
    H. a pair of steerable wheels each mounted at an opposite end of said front axle bolster;
    I. means connected to said steerable ski-mounting bracket for steerably controlling said steerable wheels; and
    J. means for transmitting driving power from said drive shaft to said rear axle shaft.

2. The wheeled undercarriage of claim 1 wherein:
    K. said steerable wheels are mounted to said front axle bolster in such a position as to have camber;
    L. said connection between said front axle bolster and said positioning bar including:
        (1) a camber control arm integral with and extending rearwardly from a central portion of the front axle bolster,
        (2) a hanger bolt mounted on the undercarriage positioning bar, and
        (3) adjustable means for positioning the rearward end of the camber control arm at a fixed distance from said undercarriage positioning bar on said hanger bolt.

3. The wheeled undercarriage of claim 1 wherein said means for transmitting driving power from said drive shaft to said rear axle shaft includes:
    K. a drive sprocket fixed on said drive shaft;
    L. a driven sprocket fixed on said rear axle, and
    M. an endless drive chain operably associated with said drive sprocket and said driven sprocket.

4. The wheeled undercarriage of claim 1 wherein each of said resilient suspension assemblies includes a substantially spiral shape, compression coil spring pinned on one end to said snowmobile body and on the other end with respect to said rear axle casing.

5. The wheeled undercarriage of claim 4 wherein each of said suspension assemblies also includes a telescoping pipe assembly consisting of a first pipe pinned to said snowmobile body and a second pipe telescopically related to the first pipe and pinned adjacent the rear axle casing; the relationship between the outer diameter of the telescoping pipes and the inner diameter defined by the compression coil springs being such that any tendency for the compression coil spring to buckle out of spiral shape is defeated by the presence of the telescoping pipe assembly.

6. The wheeled undercarriage of claim 1 wherein said undercarriage positioning bar is mounted to the snowmobile body inside of the tunnel to extend transversely of the longitudinal axis of the snowmobile.

7. The wheeled undercarriage of claim 1;
    K. A semicircular undercarriage steering yoke rotatably mounted with respect to the front wheel bolster, and provided with rocket pin receiving slots therein;
    L. an undercarriage steering column integral with said yoke and extending downwardly through said bolster;
    M. a steering crank arm integral with said steering column and extending outwardly therefrom;
    N. steering linkage members operably connected between said steering crank arm and said steerable wheels;
    O. a ski rocker pin extending through said steerable ski-mounting bracket to have its axis lying at right angles to the axis of rotation of said steerable ski-mounting bracket with respect to said snowmobile body, said rocker pin axis passing through said ski-mounting bracket axis;
    P. said ski rocker pin extending through said slots in said yoke and positioned to have its axis passing through the axis of rotation of the steering column.

8. The wheeled undercarriage of claim 7 wherein said steering linkage members include:
    Q. wheel steering arms extending rearwardly of said steerable wheels;
    R. a rigid tie rod pivotally mounted to outer ends of each wheel steering arm; and
    S. a steering rod connected between said steering crank arm and said tie rods.

9. The wheeled undercarriage of claim 1 wherein said means for restricting transverse movement of said snowmobile body with respect to said rear wheels includes a stabilizing bar pivotally mounted on one end to one side of said snowmobile body and on the other end to said rear wheel support frame.

* * * * *